Sept. 26, 1944.   J. G. WALZ   2,359,176
SPLASH-PROTECTOR
Filed Sept. 15, 1942
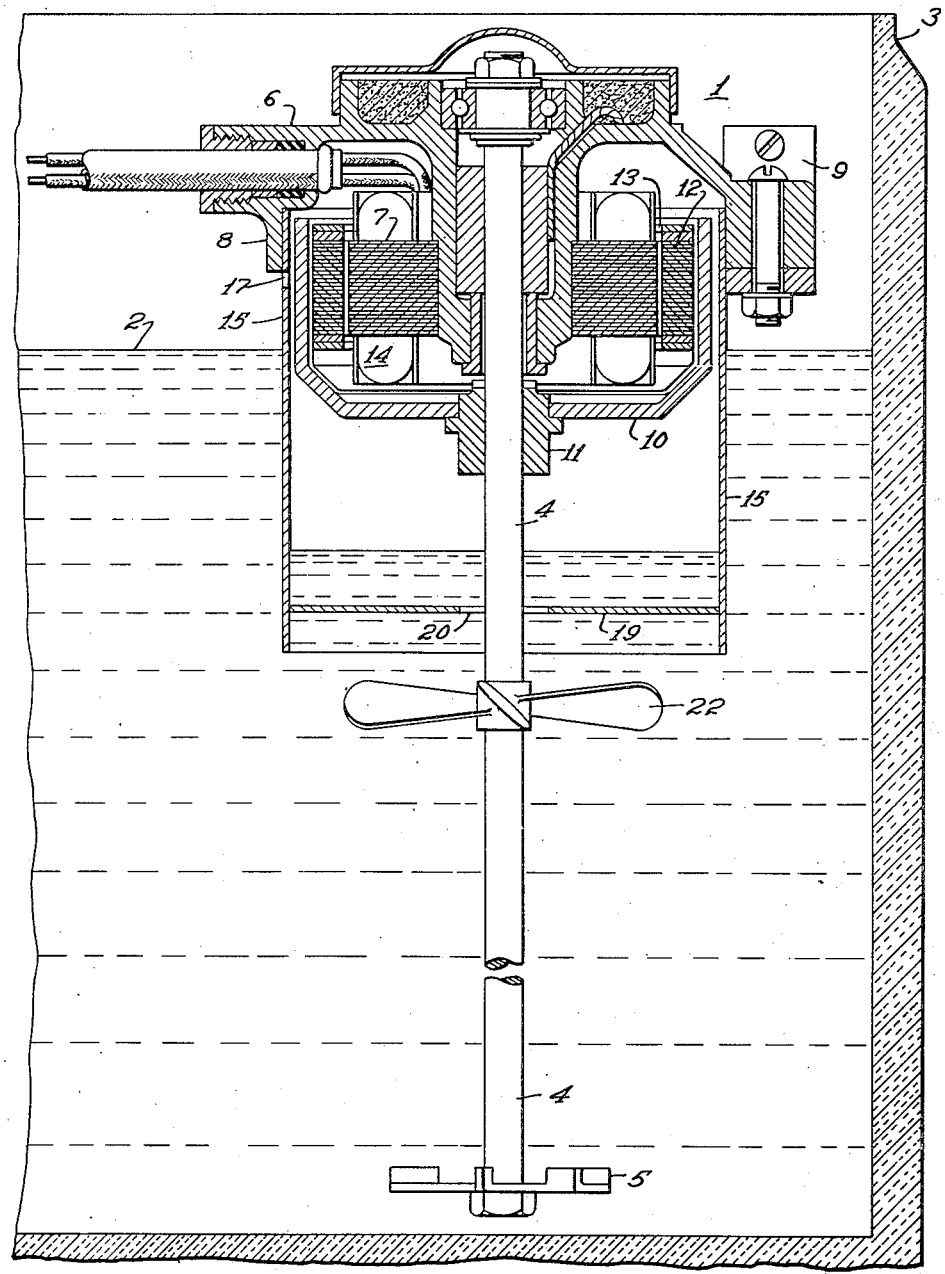
WITNESSES:
INVENTOR
John G. Walz.
BY
ATTORNEY Patented Sept. 26, 1944

2,359,176

UNITED STATES PATENT OFFICE 2,359,176

SPLASH PROTECTOR

John G. Walz, Holyoke, Mass., assignor to Westinghouse Electric & Manufacturing Company, East Pittsburgh, Pa., a corporation of Pennsylvania Application September 15, 1942, Serial No. 458,383

4 Claims. (Cl. 172—36)

My invention relates to motor-driven agitators for a liquid-bath, as in refrigerated coolers for bottles of beverages. These coolers have small, vertically mounted motors having depending shafts which extend downwardly into the refrigerated liquid, usually water, and carry a rotating agitator for circulating the cold liquid around the beverage-bottles which are placed in the tank of cold water. These motors are subject to difficulties resulting from the fact that the water-level is subject to variations in height, due partly to carelessness of the operator, and partly to variations in the number of bottles placed in the cooler. Perhaps a more serious trouble results, however, from the habit of some operators of moving the cooler, thus splashing water up onto and into the motor, where it does considerable damage to the winding-insulation, resulting in some motor-failures, in spite of all that has been done heretofore, to avoid this trouble.

My invention relates to a novel splash-protector shield, which separates the water next to the motor from the rest of the water in the cooler, so as to prevent waves from the main portion of the cooler from reaching the motor.

It is an object of my invention to provide such a shield, and to improve its performance by providing it with one or more perforations, preferably at the level of the motor-rotor, when the motor is of a type having an external rotor, and sometimes associated with blade-means carried by the shaft, below the normal level of the water, for forcing the water in a downward direction out of the space enclosed by the splash-protector shield, so as to reduce the water-level within the shield, and still further protect the motor against the danger of the entrance of water. When the motor is of the external-rotor type, the perforated splash-protector shield closely surrounds the rotor, in spaced relation thereto, so that the rotation of the rotor whirls the water around and expels it through the perforations in the shield, by centrifugal force, in case the water-level should come up to a height sufficient to reach the rotor-member, thus safeguarding the motor against the entrance of water, since the rotor-member is a cup-shaped member into which water cannot enter except at the top.

With the foregoing and other objects in view, my invention consists in the apparatus, parts, attachments, combinations, and methods hereinafter described and claimed, and illustrated in the accompanying drawing, the single figure of which is a vertical cross-sectional view through a water-cooler and a shielded circulator-motor embodying my invention.

Referring to the drawing, the electric circulator-motor is shown at 1, for agitating or circulating water or other liquid 2 in a liquid-bath which is contained in a tank 3. The motor is provided with a vertical shaft 4, the lower end of which terminates in a liquid-agitator 5 which is disposed near the bottom of the tank of water. The motor has an inverted cup-shaped stator-member 6 having an inner annular stator-core portion 7 and a spaced outer stator-bracket member 8 which is mounted above the level of the water 2, as by means of one or more supporting-brackets 9 which are carried by the wall of the tank 3. The motor is further provided with a cup-shaped rotor-member 10 having a lower hub-portion 11 which is secured to the vertical shaft 4, and having an annular rotor-core portion 12 extending upwardly in spaced relation between the stator-core portion 7 and the stator-bracket member 8, with the motor-airgap 13 between the stator and rotor core-portions 7 and 12. The motor, as thus far described, is a known type of motor, in which the rotor member is outside of the stator-portion 7 which carries the stator-windings 14, the rotor-member being cup-shaped so that no water can get into it, so as to reach the stator-windings 14 or any other vital electrical part of the motor, except by passing over the top of the annular rotor-core portion 12.

In accordance with my present invention, I provide a splash-protector 15 which is shown in the form of a cylindrical or tubular shield carried by the stator-bracket member 8, and, in fact, constituting a downwardly extending extension of the stator-bracket member 8, the protector-shield 15 being either integral with the stator-bracket member 8, or attached thereto. The upper end of the splash-protector 15 is thus disposed in spaced relation around the rotor-member 10. The splash-protector extends on down below the rotor-member, and down below the highest working-level of the water 2 in the tank 3, so that the water inside of the splash-protector shield 15 is separated, or substantially separated, from the rest of the water in the tank, so that waves set up in the tank, by movement of the beverage-cooler, will not be readily communicated with the water within the shield, which is next to the motor, thus in large measure protecting the motor against splashing water.

The splash-protector 15, near its upper portion, is provided with one or more perforations 17, at a level which is intermediate between the top and the bottom of the annular rotor-core portion 12, so that, if the water-level should reach up as high as the bottom portion of the cup-shaped rotor-member 10, the water will be whirled around, by the rotation of the rotor, in the small annular space between the rotor-member and the protector-shield 15, thus expelling the water, by centrifugal force, through the opening or openings 17, to the air at a point above the level of the water 2 in the tank 3, thus preventing the water from rising as high as the top of the rotor-member, and hence preventing the water from reaching any vital electrical part of the motor.

The lower portion of the splash-protector 15, at a point below the highest working-level of the water 2 in the tank, or at least below a normal or expectable working-level of the water, is preferably shaped inwardly, so as to closely surround the motor-shaft in spaced relation thereto, as by being provided with a bottom member 19, which is centrally perforated at 20, to provide a limited-opening communication between the liquid which is next to the motor, that is, the liquid enclosed within the protector-member 15—19, and the rest of the liquid in the tank 3.

In some cases, as in the illustrated form of embodiment of my invention, shown in the drawing, it may be desirable to additionally provide a propeller or other blade-means 22, carried by the shaft 4 below the normal level of the water, for forcing the water in a downward direction out of the space enclosed by the protector-shield 15—19, thus reducing the water-level within the shield, when the motor is operating, and keeping the level of this shield-segregated water below the motor-rotor 10, even though the level of the water 2 in the rest of the tank is higher than the bottom of the rotor-member, as shown—thus keeping the motor from continuously pumping water out of the perforation or perforations 17 in the upper portion of the shield 15. When the propeller-blades 22 are utilized, if the water-level is as high as is indicated in the drawing at 2, so as to be up to the rotor-member 10, the first operation resulting from the starting up of the motor will be for the motor to expel some of the water within the shield 15 by centrifugal action, from the opening or openings 17, that is, if the water-level is high enough to cause such action. The propeller-blades 22 subsequently become effective to lower the level of the water within the shield 15, thus giving the motor its maximum protection against becoming wet internally by reason of splashing.

It will be noted that the perforation or the perforations 17 in the upper portion of the shield provide a communication between the space inside of the shield and the outer air, so as to equalize the air-pressure inside and outside of the shield, thus permitting the liquid-level within the shield to properly adjust itself, and preventing difficulties from arising as a result of temperature-changes which might otherwise tend to suck the water up into the motor, thus differing from previous circulator-motor constructions utilizing the diving-bell principle.

While I have described my splash-protector motor in a preferred form of embodiment, I wish it to be understood that my invention is not limited to this precise form of construction, and I desire that the appended claims shall be accorded the broadest construction consistent with their language.

I claim as my invention:

1. A splash-protector for a circulator-motor for circulating a liquid in a liquid-bath, said motor being a vertical-shaft motor having an inverted cup-shaped stator-member having an inner annular stator-core portion and a spaced outer stator-bracket member mounted above the liquid of the liquid-bath, said motor further having a cup-shaped rotor-member having a lower hub-portion secured to the vertical shaft and an annular rotor-portion extending upwardly in spaced relation between the stator-core portion and the stator-bracket member in airgap-relation to the stator-core portion, the vertical shaft depending below the rotor-member characterized by said splash-protector comprising a downwardly extending stator-bracket extension, extending down from the stator-bracket member in closely spaced relation around the rotor-member, and extending on down below the rotor-member, and down below the highest working-level of the liquid in the liquid-bath, for substantially separating the liquid next to the motor from the rest of the liquid in the liquid-bath, to prevent waves from the main portion of the liquid-bath from readily reaching the motor, an upper portion of said stator-bracket extension, at a level intermediate between the top and the bottom of the annular rotor-core portion, being provided with one or more openings to the air at a point above the level of the liquid in the liquid-bath, said one or more openings being sufficiently small to limit the amount of water that can splash through the same as a result of waves in said liquid-bath, and yet sufficiently large to discharge any water pumped out by the centrifugal effect of the rotating rotor-core portion.

2. The invention as defined in claim 1, characterized by said splash-protector having its lower portion shaped inwardly, at a point below the highest working-level of the liquid of the liquid-bath, to closely surround the motor-shaft in spaced relation thereto, for providing a limited-opening communication between the liquid next to the motor, within said splash-protector, and the rest of the liquid in the liquid-bath.

3. A splash-protector for a circulator-motor for circulator a liquid in a liquid-bath, said motor being a vertical-shaft motor having an inverted cup-shaped stator-member having an inner annular stator-core portion and a spaced outer stator-bracket member mounted above the liquid of the liquid-bath, said motor further having a cup-shaped rotor-member having a lower hub-portion secured to the vertical shaft and an annular rotor-core portion extending upwardly in spaced relation between the stator-core portion and the stator-bracket member in airgap-relation to the stator-core portion, the vertical shaft depending below the rotor-member, characterized by said splash-protector comprising a downwardly extending stator-bracket extension, extending down from the stator-bracket member in spaced relation around the rotor-member, and extending on down below the rotor-member, and down below the highest working-level of the liquid in the liquid-bath, for substantially separating the liquid next to the motor from the rest of the liquid in the liquid-bath, to prevent waves from the main portion of the liquid-bath from readily reaching the motor, blade-means carried by the shaft, below the normal level of the liquid, for forcing the liquid in a downward direction out of the space enclosed by said stator-bracket extension, and means for providing air-communication from inside of the stator-bracket extension to the outer air at a point above the level of the liquid in the liquid-bath.

4. The invention as defined in claim 3, characterized by said stator-bracket extension having its lower portion shaped inwardly, at a point below the highest working-level of the liquid, to closely surround the motor-shaft in spaced relation thereto, for providing a limited-opening communication between the liquid next to the motor, within said stator-bracket extension, and the rest of the liquid in the liquid-bath.

JOHN G. WALZ.